March 17, 1931.    L. R. ELMERS    1,796,864
SAW
Filed Dec. 30, 1929
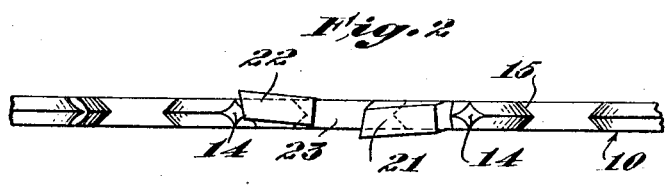
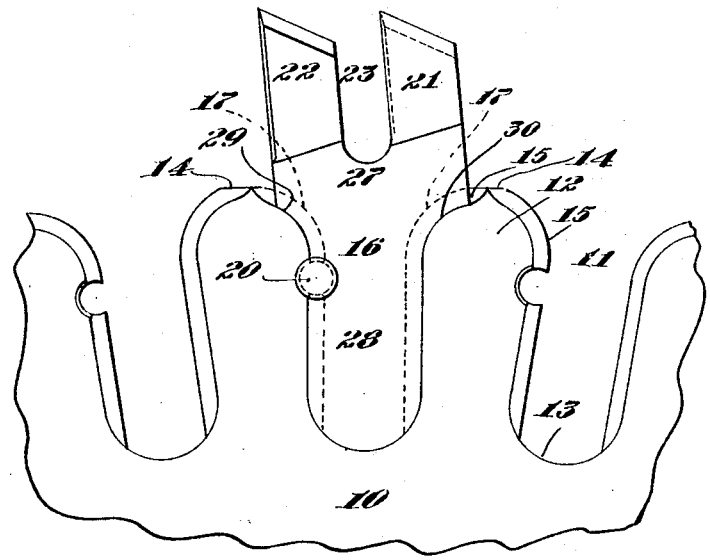

Patented Mar. 17, 1931

1,796,864

UNITED STATES PATENT OFFICE

LEON R. ELMERS, OF SEATTLE, WASHINGTON, ASSIGNOR TO SIMONDS SAW AND STEEL COMPANY, OF FITCHBURG, MASSACHUSETTS, A CORPORATION OF MASSACHUSETTS

SAW

Application filed December 30, 1929. Serial No. 417,373.

This invention relates to saw constructions applicable to saws having either a rotary or reciprocating motion, and in which a plurality of insertable cutting units are carried by a moving blade.

One of the objects of my invention is to provide a saw construction having insertable cutting units in which a large number of teeth may be employed for a unit of length or circumference of the saw blade, and in which the teeth, though relatively narrow and closely spaced, will be rigidly supported without undue weakening of the blade of the saw. Another object of my invention is to provide an insertable cutting unit provided with a pair of cutting blades and having features of strength not heretofore found in insertable units of this kind.

In one aspect my invention contemplates an insertable cutting unit having teeth which are alternately inclined toward opposite sides of the saw blade. These teeth may be disposed in this manner by forging or bending after the insertable cutting unit has been formed. My preferred construction also contemplates the use of interfitting parts on the insertable cutting units and the saw blade, and it is important that the interfitting parts of the insertable cutting units be not distorted during the forging or bending operation in which preformed teeth are displaced laterally in opposite directions, as such a distortion would interfere with inserting the units in the saw blade. Accordingly, a further object of my invention is to provide a toothed insertable cutting unit, having interfitting parts for engaging a saw blade, and of such shape that the teeth may be displaced by a forging or bending operation into their desired cutting positions without distortion of the interfitting parts.

Other objects of the invention will be apparent from the following specification taken in connection with the drawings which form a part thereof.

In the drawings:

Fig. 1 is a side elevation of a saw blade carrying one of the insertable cutting units; and Fig. 2 is a top elevation of the structure of Fig. 1.

A preferable form of the saw blade indicated at 10 in Fig. 1 is provided with alternate recesses 11 and projections 12, having generally rounded ends 13 and 14 respectively. Referring to Fig. 2, the edges of each of the projections 12 are formed with angular tongues 15. An insertable cutting unit indicated generally by the numeral 16 is adapted to be inserted in each of the recesses 11, and for convenience of illustration only one of these insertable units is illustrated in position on the blade. In Figs. 1 and 2, the tongues 15 on the projections 12 closely engage corresponding grooves indicated generally by the numeral 17, on the insertable cutting units. The tongues 15 and the grooves 17 thus constitute interfitting elements which maintain the insertable cutting units in place laterally of the saw blade. Any suitable securing means, such as an insertable rivet 20 may be employed to lock the insertable cutting unit to the saw blade.

My improved insertable cutting unit indicated by the numeral 16 comprises a pair of cutting teeth 21 and 22, each of which is preferably of substantially equal width throughout its length and of a generally prismatic shape and has a truncated outer end. This construction provides a tooth which is better adapted to withstand cutting stresses than teeth which diminish in width toward their outer end. As viewed from the side in Fig. 1, the two teeth 21 and 22 appear to extend in parallel directions, but as viewed from the top in Fig. 2, the alternate teeth are displaced in opposite directions as, for example, by bending, so as to provide cutting edges spaced farther apart than the width of the saw blade. A gullet 23 extends between the two teeth and is provided with a bottom located some distance above the tops of the projections 12 of the saw blade. Referring to Fig. 1, the edges of the teeth on the opposite sides from the gullet 23 continue substantially in prolongation with the outer portions of the teeth until they reach the projections 12 of the saw blade. Accordingly there is formed in the insertable cutting unit an intermediate portion, indicated by the numeral 27, having a width equal to the combined widths of the two cutting teeth and the intermediate gullet. Below this intermediate portion 27 the insertable cutting unit becomes more narrow in width following the curve of the two adjacent projections 12 and constitutes an elongated shank indicated by the numeral 28.

Referring to Fig. 1, the interfitting elements comprising the grooves 17 on the insertable cutting unit extend substantially the entire length of the shank 28 and curve out to the sides of the insertable cutting unit at the lower portion of the intermediate wider portion 27. The intermediate wide portion 27 of the insertable cutting unit, extending from side to side thereof, provides a much greater resistance to lateral bending than the narrow shank 28 and is very effective in preventing the distortion of the shank 28 and its groove 17 when the teeth 21 and 22 are forged or bent for the purpose of displacing them into the position of Fig. 2. Since it is sometimes advisable to alter the angular displacement of the two teeth of an insertable unit, this feature of preventing distortion of the interfitting elements is of utility in a finished unit as well as in its manufacture.

Referring to Fig. 1, the curvature of the insertable unit at the point where the relatively narrow shank 28 merges into the intermediate portion 27 provides oppositely disposed shoulders 29 and 30 which bear against corresponding surfaces on the projections 12. These shoulders are so located that the shortest distance from the gullet to either of the shoulders is at least approximately as great as the width of one of the teeth, and of the order of the width of the shank 28. The shoulders 29 and 30 are very effective in transmitting directly to the saw blade a considerable portion of the stress resulting from the cutting action, and therefore relieve the shank from a considerable part of the stress which is imparted to it in the usual form of insertable cutting unit. At the same time these shoulders 29 and 30 of the insertable cutting unit are located adjacent to the outer periphery of the blade proper, and hence the portion of the blade that is slightly cut away to receive these shoulders does not cause an appreciable weakening of the blade as a whole.

Referring to Fig. 1, the shank 28 of the insertable cutting unit has a width which is of the order of the width of one of the teeth 21 or 22 and a width of the order of half the combined width of the two teeth and the intermediate gullet. A preferable proportion is that shown in the drawings wherein the maximum width of the shank is approximately half the combined width of the two teeth and the intermediate gullet and the minimum width of the shank (from groove to groove) is approximately equal to the width of each tooth.

As a result of this use of a relatively narrow shank, the recess 11 provided in the saw blade is considerably more narrow than the recess which it has been previously proposed to provide for insertable double toothed cutting units. Because of the use of a relatively narrow recess, I am able to place the recesses relatively closer together than in former constructions, and hence obtain the advantageous result of providing insertable units at closer intervals than formerly. By providing insertable units at closer intervals than formerly, I am able to produce a saw capable of a much smoother and faster cut.

At the same time the fact that the distance between the gullet and each of the shoulders 29 and 30 is of the order of the width of shank 28 or at least approximately as great as the width of one of the teeth insures that each tooth will be adequately supported to resist bending stresses even though a relatively narrow shank 28 is used, as shown. Referring to Fig. 1, other similar insertable units may be inserted in the recesses 11 which are illustrated as vacant, and when thus inserted their teeth will be positioned relatively close to the teeth of the adjacent insertable units. In this manner it is possible to provide a saw of which the teeth are formed in pairs, and in which each of the teeth is spaced a substantially equal distance from each of its neighboring teeth. Referring to Fig. 1, the width of the shank 28 of the insertable unit is of approximately the same as that of the projection 12 on the saw blade. This feature provides an equality of strength between the insertable units and the saw blade, and permits the utilization of a maximum number of teeth upon the saw blade.

I claim:

1. An insertable cutting unit comprising two teeth and a shank integral therewith, the teeth being spaced to provide a gullet therebetween, the shank having a minimum width approximating the width of one of said teeth.

2. An insertable cutting unit comprising two teeth and a shank integral therewith, each of said teeth having a width which is substantially uniform throughout its length, the teeth being spaced to provide a gullet therebetween, the shank having a maximum width approximating half the combined width of the pair of teeth and the gullet.

3. An insertable cutting unit comprising two teeth of substantially equal width throughout their length and a shank integral therewith, said teeth being spaced to provide a gullet therebetween, a portion of said unit adjacent and directly below the bottom of the gullet having a width substantially equal to the combined width of the two teeth and the gullet, and the shank having a minimum width approximating the width of a single tooth.

4. An insertable cutting unit comprising two teeth of substantially equal width throughout their length and a shank integral therewith, said teeth being spaced to provide a gullet therebetween, a portion of said unit adjacent and directly below the bottom of the gullet having a width substantially equal to the combined width of the two teeth and the gullet, and the shank having a maximum width approximating half said combined width.

5. An insertable cutting unit comprising two teeth of substantially equal width throughout their length, and a shank integral therewith, said teeth being spaced to provide a gullet therebetween, an intermediate portion of said unit adjacent and directly below the bottom of the gullet having a width approximating the combined width of the two teeth and the gullet, opposite sides of said intermediate portion being provided with shoulders adapted to engage surfaces of projections from a saw blade, said shoulders being concave and merging tangentially with said shank, and means on said shank and said shoulders for interfitting with a saw blade.

6. An insertable cutting unit comprising two teeth and a single shank integral therewith and having a minimum width approximating that of one of said teeth, said teeth being spaced to provide a gullet therebetween, an intermediate portion of said unit adjacent and directly below the bottom of the gullet having a width approximating the combined width of the two teeth and the gullet, opposite sides of said intermediate portion being provided with shoulders adapted to engage surfaces of projections from a saw blade, the distance from the gullet to each of said shoulders being at least approximately as great as the width of one of said teeth.

7. An insertable cutting unit comprising two teeth and a single shank integral therewith and having a minimum width approximating that of one of said teeth, said teeth being spaced to provide a gullet therebetween, an intermediate portion of said unit adjacent and directly below the bottom of the gullet having a width approximating the combined width of the two teeth and the gullet, opposite sides of said intermediate portion being provided with shoulders merging into said shank and adapted to engage surfaces of projections from a saw blade, the distance from the gullet to each of said shoulders being at least approximately as great as the width of one of said teeth.

8. A saw comprising a blade and a plurality of double toothed cutting units, each of said cutting units comprising a pair of teeth having a gullet therebetween, and a shank having a minimum width approximating the width of one of said teeth and engaging a recess in said blade, the projections formed between adjacent recesses in said blade having approximately the same width as the width of said shank.

Signed by me at Seattle, Washington, this sixteenth day of December, 1929.

LEON R. ELMERS.